(12) United States Patent
Hong et al.

(10) Patent No.: US 8,520,267 B2
(45) Date of Patent: Aug. 27, 2013

(54) HOST APPARATUS AND CONTROL METHOD THEREOF, AND IMAGE READING APPARATUS CONTROLLED BY HOST APPARATUS

(75) Inventors: Jung-mo Hong, Suwon-si (KR); Hak-ju Lee, Suwon-si (KR); Hyun-jung Park, Seoul (KR); Dong-hoan Koo, Suwon-si (KR); Kyung-hoon Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 747 days.

(21) Appl. No.: 12/656,773

(22) Filed: Feb. 16, 2010

(65) Prior Publication Data
US 2010/0315686 A1    Dec. 16, 2010

(30) Foreign Application Priority Data
Jun. 12, 2009    (KR) .............................. 2009-0052518

(51) Int. Cl.
*H04N 1/32*    (2006.01)

(52) U.S. Cl.
USPC ........... 358/442; 358/1.15; 358/468; 715/743

(58) Field of Classification Search
USPC ................ 358/1.15, 442, 474; 715/700, 740, 715/743, 783
See application file for complete search history.

(56) References Cited

U.S. PATENT DOCUMENTS

| | | | |
|---|---|---|---|
| 7,676,750 B2 * | 3/2010 | Lindsey et al. ............... | 715/743 |
| 2003/0177448 A1 * | 9/2003 | Levine et al. ................. | 715/530 |
| 2004/0118925 A1 * | 6/2004 | Kelly et al. ............... | 235/462.15 |
| 2007/0211310 A1 * | 9/2007 | Kadota ......................... | 358/474 |
| 2008/0184162 A1 * | 7/2008 | Lindsey et al. ............... | 715/783 |
| 2008/0312944 A1 * | 12/2008 | Scaff ................................. | 705/1 |
| 2009/0015862 A1 * | 1/2009 | Kim ........................... | 358/1.15 |
| 2009/0094539 A1 | 4/2009 | Wang et al. | |
| 2009/0225349 A1 * | 9/2009 | Hirai ........................... | 358/1.15 |
| 2011/0317211 A1 * | 12/2011 | Yamada et al. ............. | 358/1.15 |

OTHER PUBLICATIONS

European Search Report dated Dec. 2, 2011 issued in corresponding European Patent Application No. 10157622.1.

* cited by examiner

*Primary Examiner* — Kimberly A Williams
(74) *Attorney, Agent, or Firm* — Staas & Halsey LLP

(57) ABSTRACT

A method for controlling the host apparatus includes searching for at least one image reading apparatus being connected to the host apparatus; displaying a list of image reading apparatuses using the first information of the searched at least one image reading apparatus; selecting one of the at least image reading apparatus from the displayed list of image reading apparatuses; displaying a user interface (UI) for selecting a scanning option which includes the second information of the selected image reading apparatus using the second information corresponding to the selected image reading apparatus; and controlling the selected image reading apparatus to perform a scanning operation according to the scanning option which is input through the UI for selecting a scanning option. Accordingly, a plurality of image reading apparatuses are controlled by a single universal driver without the need of installing driver programs for each of the image reading apparatuses.

18 Claims, 10 Drawing Sheets

HOST APPARATUS AND CONTROL METHOD THEREOF, AND IMAGE READING APPARATUS CONTROLLED BY HOST APPARATUS

CROSS-REFERENCE TO RELATED APPLICATIONS

This application claims the benefit of Korean Patent Application No. 2009-52518, filed in the Korean Intellectual Property Office on Jun. 12, 2009, the disclosure of which is incorporated herein by reference.

BACKGROUND

1. Field

Aspects of the embodiments relate to a host apparatus and a control method thereof, and an image reading apparatus controlled by the host apparatus, and more particularly, to a host apparatus which is capable of controlling a plurality of image reading apparatuses using a single driver and a control method thereof, and an image reading apparatus controlled by the host apparatus.

2. Description of the Related Art

A scanner is a device that optically scans various types of documents such as printed text, images, photographs, and so on, and converts it to a digital image. A user should install a scanner driver in a host device being connected to the scanner in order to use the scanner.

A method for using a conventional scanner driver will be simply explained. A user drives an application program and selects a menu to select a scanner. The application program provides a list of scanners based on a scanner driver installed in a host apparatus. A user selects a desired scanner from a list of scanners, and thus a driver of the selected scanner is driven. The driven driver provides a user interface (UI), and a user selects an option to form an image through the UI and executes the selected scanner to operate.

A different type of scanner driver is provided for each manufacturer and each model. Accordingly, if a user desires to use a plurality of scanners, the user needs to install a plurality of scanner drivers for the plurality of scanners in a host apparatus. Also, if a plurality of host apparatuses are connected to the plurality of scanners through a network, the network manager needs to install a plurality of drivers for the scanners in all of the host apparatuses.

As described above, in order to use a plurality of scanners, a plurality of scanner drivers for each type of scanners should be installed in a host apparatus and thus it is disadvantageous in that high cost is required to install and manage the plurality of scanner drivers. In addition, as the plurality of scanner drivers are installed, a lot of time is required to load the corresponding drivers, and considerable storage space is required in a host. Moreover, a user needs to update all of the scanner drivers one by one, and may feel difficulties in selecting a desired scanner.

SUMMARY

Aspects of the embodiments relate to a host apparatus capable of using a desired image reading apparatus due to a universal driver which provides a user interface (UI) to select different scanning options for each image reading apparatus, without installing a plurality of drivers for each image reading apparatus and a control method thereof, and an image reading apparatus controlled by the host apparatus.

According to an aspect of the embodiments, there is provided a method for controlling a host apparatus having a universal driver which controls a plurality of image reading apparatuses, the method including searching for at least one image reading apparatus being connected to the host apparatus; displaying a list of image reading apparatuses using the first information of the searched at least one image reading apparatus; selecting one of the at least image reading apparatus from the displayed list of image reading apparatuses; displaying a user interface (UI) for selecting a scanning option which includes the second information of the selected image reading apparatus using the second information corresponding to the selected image reading apparatus; and controlling the selected image reading apparatus to perform a scanning operation according to the scanning option which is input through the UI for selecting a scanning option.

According to another aspect of the embodiments, the method may further include registering the information of the image reading apparatus to a registry, wherein the information of the image reading apparatus includes at least one of a name, an address, a location, and a current state of the selected image reading apparatus.

According to another aspect of the embodiments, the method may further include requesting the selected image reading apparatus to transmit the second information.

According to another aspect of the embodiments, the method may further include executing the universal driver.

According to another aspect of the embodiments, the method may further include further registering the second information of the selected image reading apparatus to the registry.

According to another aspect of the embodiments, displaying the UI for selecting a scanning option may include if the first information of the selected image reading apparatus is registered to the registry, displaying the UI for selecting a scanning option using the registered second information; and if the first information of the selected image reading apparatus is not registered to the registry, receiving the second information from the selected image reading apparatus and displaying the UI for selecting a scanning option.

According to another aspect of the embodiments, the method may further include displaying a list of the image reading apparatuses previously registered to the registry before searching for at least one image reading apparatus.

According to another aspect of the embodiments, displaying the UI for selecting a scanning option may include receiving the second information from the image reading apparatus using the first information of the image reading apparatus registered to the registry; forming the UI for selecting a scanning option using the received second information; and displaying the formed UI for selecting a scanning option.

According to another aspect of the embodiments, the second information may include at least one of a current state of an image reading apparatus, resolution, source information of a document, whether or not the page count is supported, a type of image, the maximum size of paper, optical resolution, a supportable compression method, whether or not an encryption is supported, and whether or not a user authentication is supported.

According to another aspect of the embodiments, the method may further include if the selected image reading apparatus supports a protocol different from that of the universal driver, converting the command to perform a scanning operation into a protocol which the selected image reading apparatus supports, wherein the controlling may include transmitting the command which is converted into the protocol supported by the image reading apparatus to the selected image reading apparatus, and controlling the image reading apparatus to perform the scanning operation.

According to another aspect of the embodiments, the protocol may include one of a technology without an important name (TWAIN) and a window image acquisition (WIA).

According to another aspect of the embodiments, the method may further include determining whether the second information of the selected image reading apparatus is supported by the universal driver or not, wherein the displaying the UI for selecting a scanning option may include if it is determined that the universal driver supports the second information, displaying the UI for selecting a scanning option which is formed using the second information; and if it is determined that the universal driver does not support the second information, displaying the UI for selecting a scanning option which is formed using the previously stored second information of the selected image reading apparatus.

According to another aspect of the embodiments, there is provided a host apparatus, including an agent unit to search for at least one image reading apparatus; a display to display a list of image reading apparatuses using the first information of the searched at least one image reading apparatus; and a universal driver, if one of the at least image reading apparatus is selected from the displayed list of image reading apparatuses, to form a user interface (UI) for selecting a scanning option which includes the second information of the selected image reading apparatus using the second information corresponding to the selected image reading apparatus, wherein the display displays the UI for selecting a scanning option, and the universal driver controls the selected image reading apparatus to perform a scanning operation according to the scanning option which is input through the UI for selecting a scanning option.

According to another aspect of the embodiments, the agent unit may register the first and second information of the selected image reading apparatus to a registry.

According to another aspect of the embodiments, if the first information of the selected image reading apparatus is registered to the registry, the universal driver may form the UI for selecting a scanning option using the registered second information, and if the first information of the selected image reading apparatus is not registered to the registry, the universal driver may receive the second information from the selected image reading apparatus and forms the UI for selecting a scanning option.

According to another aspect of the embodiments, the universal driver may receive the second information from the image reading apparatus using the first information of the selected image reading apparatus, and form the UI for selecting a scanning option using the received second information.

According to another aspect of the embodiments, the host apparatus may further include if the selected image reading apparatus supports a protocol different from that of the universal driver, a protocol conversion unit to convert the command to perform a scanning operation into a protocol which the selected image reading apparatus supports; and a first interface to transmit the command which is converted into the protocol supported by the image reading apparatus to the image reading apparatus.

According to another aspect of the embodiments, there is provided an image reading apparatus, including a storage unit to store first and second information; a second interface to receive a signal for searching for a plurality of image reading apparatuses and a signal for requesting information from a host apparatus having a universal driver which controls the plurality of image reading apparatuses; and a controller, if the signal for searching for the image reading apparatuses is received through the second interface, to transmit the stored first information to the host apparatus, and if the signal for requesting information is received, to transmit the stored second information to the host apparatus.

Additional aspects and/or advantages of the embodiments will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to the exemplary embodiments of the present invention, examples of which are illustrated in the accompanying drawings, wherein like reference numerals refer to like elements throughout. The embodiments are described below, in order to explain the present invention by referring to the figures.

Figure 1:
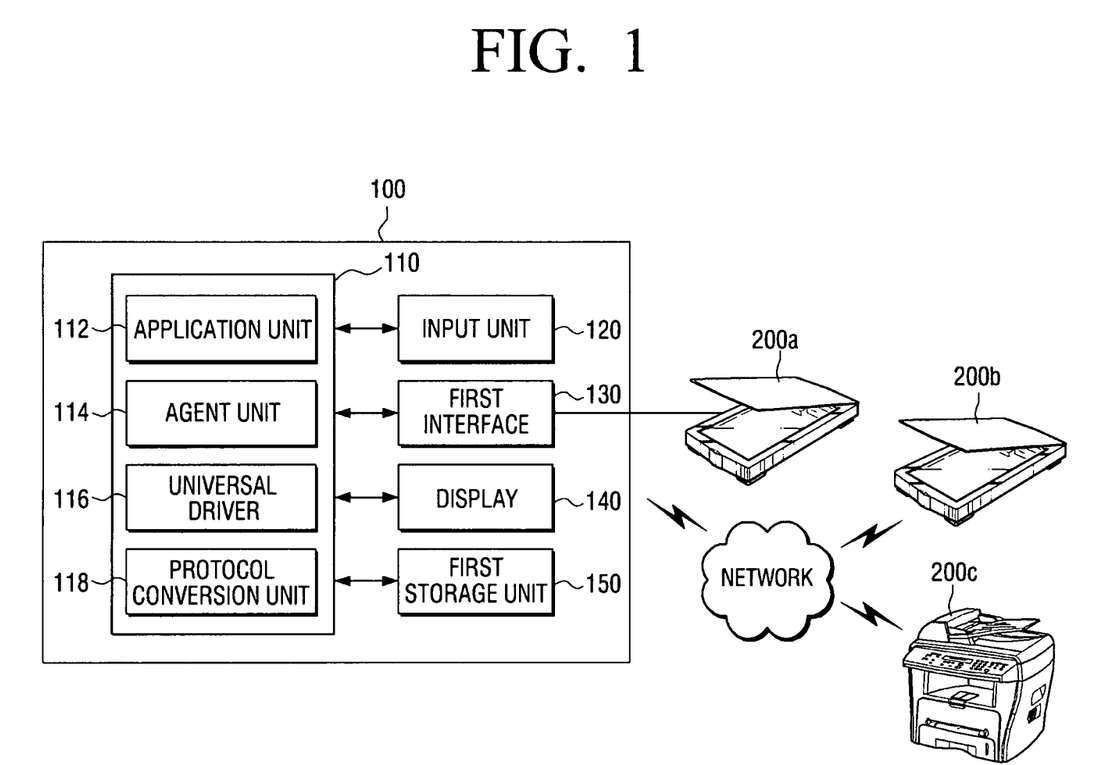
FIG. 1 is a block diagram of a host apparatus according to an exemplary embodiment.

FIG. 1 is a block diagram of a host apparatus according to an exemplary embodiment.

Referring to FIG. 1, a host apparatus 100 according to an exemplary embodiment includes a main controller 110, an input unit 120, a first interface 130, a display 140, and a first storage unit 150.

At least one image reading apparatus may be connected to the host apparatus 100 through local connection such as a universal serial bus (USB) or through a network over wire or wirelessly. An image reading apparatus 200a which is connected to the host apparatus 100 through local connection and two image reading apparatuses 200b, 200c which are connected to the host apparatus 100 over a network are illustrated in this exemplary embodiment of the present invention for ease of explanation.

The image reading apparatuses 200a to 200c connected to the host apparatus 100 may be single functional devices which perform only a scanning operation or a multi functional device which performs other operations including a scanning operation.

The main controller 110 includes an application unit 112, an agent unit 114, a universal driver 116 for image reading apparatuses, and a protocol conversion unit 118. The application unit 112, the agent unit 114, the universal driver 116, and the protocol conversion unit 118 may be driven under the control of an operating system (OS).

The application unit 112 may be a program which a user executes to use one of the image reading apparatuses 200a to 200c. The application unit 112 may be a program for editing an image or a scanner program provided by an OS. A user may select the execution of the universal driver 116 through the application unit 112.

The agent unit 114 is driven when a user selects the execution of the universal driver 116 through the application unit 112, and searches for the image reading apparatuses 200a to 200c being connected to the host apparatus 100. The agent unit 114 searches for the image reading apparatuses 200a to 200c being connected to the host apparatus 100 and then provides a list so that the first information regarding the searched image reading apparatuses 200a to 200c is displayed on the display 140.

The first information represents simple information regarding the image reading apparatuses 200a to 200c, and hereinbelow will be referred to as apparatus information. The apparatus information may include at least one of a model name, an address, a location, and a current state of the image reading apparatus 200a, 200b, or 200c.

Specifically, the agent unit 114 controls the first interface 130 to transmit a signal for searching for apparatuses to the image reading apparatuses 200a to 200c being connected to the host apparatus 100. The image reading apparatuses 200a to 200c which receive the signal from the agent unit 114 transmit the apparatus information regarding itself to the host apparatus 100 to respond to the signal for searching for apparatuses.

A list of image reading apparatuses searched by the agent unit 114 may be displayed on the display 140, and thus a user may select a desired image reading apparatus 200a, 200b, or 200c from the displayed list. The apparatus information received from the image reading apparatuses 200a to 200c is displayed on the list of image reading apparatuses. Accordingly, a user may select a desired image reading apparatus 200a, 200b, or 200c according to the state of each image reading apparatus 200a, 200b, or 200c.

If a user selects one of the image reading apparatuses 200a to 200c, the agent unit 114 registers the apparatus information regarding the selected image reading apparatus 200a, 200b, or 200c to a registry.

The universal driver 116 forms a user interface (UI) for selecting a scanning option using the second information regarding the image reading apparatus 200a, 200b, or 200c selected from among the image reading apparatuses 200a to 200c searched by the agent unit 114, and controls the selected image reading apparatus 200a, 200b, or 200c to operate according to a scanning option input through the UI for selecting a scanning option.

The second information represents information which is received from the selected image reading apparatus 200a, 200b, or 200c so that the universal driver 116 forms the UI for selecting a scanning option, and hereinbelow will be referred to as setting information since the information relates to setting the image reading apparatuses 200a to 200c.

The setting information may include at least one of a current state of an image reading apparatus, resolution, source information of a document, whether or not the page count is supported, a type of image, the maximum size of paper, optical resolution, a supportable compression method, whether or not an encryption is supported, and whether or not a user authentication is supported.

The host apparatus 100 may receive apparatus information and setting information from the image reading apparatuses 200a to 200c. The apparatus information is received to respond to the signal that the agent unit 114 searches for the image reading apparatuses 200a to 200c, and the setting information is received to respond to the signal that the universal driver 116 requests information regarding the image reading apparatus 200a, 200b, or 200c. In this situation, an item of the apparatus information may be overlapped with an item of the setting information. That is, items of the apparatus information and the setting information may be different from each other, or a part or all of the items may be the same.

In more detail, the universal driver 116 exchanges information with one of the image reading apparatuses 200a to 200c using the apparatus information of the image reading apparatus 200a, 200b, or 200c which is registered in the registry by the agent unit 114. The universal driver 116 receives the setting information from the image reading apparatus 200a, 200b, or 200c, and forms a UI for selecting a scanning option using the received setting information. In this situation, the universal driver 116 forms a UI for selecting a scanning option which represents a menu for selecting an option regarding the setting information supportable on the image reading apparatus 200a, 200b, or 200c using the received setting information.

The universal driver 116 determines whether the apparatus information on the selected image reading apparatus 200a, 200b, or 200c is registered to the registry. If the apparatus information is registered to the registry, the universal driver 116 forms a UI for setting a scanning option using the setting information, and if the apparatus information is not registered to the registry, the universal driver 116 receives the setting information from the selected image reading apparatus 200a, 200b, or 200c, and forms a UI for selecting a scanning option. By doing so, if the desired image reading apparatus 200a, 200b, or 200c has been used previously, the process of receiving the setting information may be omitted. The apparatus information and the setting information of the image reading apparatus 200a, 200b, or 200c which has been used previously are registered to the registry, and thus the history of the previously used image reading apparatus 200a, 200b, or 200c may be managed.

The universal driver 116 forms a UI for selecting a scanning option, and causes the UI for selecting a scanning option to be displayed on the display 140. If the UI for selecting a scanning option is displayed on the display 140, a user selectively inputs a scanning option through the UI for selecting a scanning option, and the universal driver 116 controls the image reading apparatus 200a, 200b, or 200c to operate according to a scanning option input from the user.

If the image reading apparatus 200a, 200b, or 200c registered to the registry supports a protocol different from that of the universal driver 116, the protocol conversion unit 118 converts a command to perform a scanning operation into a protocol which the image reading apparatus 200a, 200b, or 200c supports.

A driver program may be designed using one of a technology without an important name (TWAIN) and a windows image acquisition (WIA). The driver program designed using TWAIN is not driven on the driver program designed using the WIA. Accordingly, if the universal driver 116 supports the WIA, conversion between the two protocols, TWAIN and WIA, is needed so as to transmit a command to the image reading apparatus 200a, 200b, or 200c which supports TWAIN.

For the above reason, if the image reading apparatus 200a, 200b, or 200c which a user desires to use supports a protocol different from that of the universal driver 116, the protocol conversion unit 118 converts the command to control a scanning operation of the image reading apparatus 200a, 200b, or 200c into a corresponding protocol so that the universal driver 116 controls the image reading apparatuses 200a to 200c irrespective of a type of protocols which the image reading apparatuses 200a to 200c support.

If the protocol conversion unit 118 converts the command to perform a scanning operation into a protocol that the image reading apparatus 200a, 200b, or 200c supports, the universal driver 116 transmits the converted command to the corresponding image reading apparatus 200a, 200b, or 200c.

The input unit 120 receives a manipulation signal which a user inputs using an input device of the host apparatus 100 such as a keyboard or a mouse. In this exemplary embodiment, the input unit 120 may receive a list selection signal for selecting one of lists of the image reading apparatuses 200a to 200c provided by the agent unit 114 and a scanning option selection signal for selecting a scanning option through the UI for selecting a scanning option.

The first interface 130 supports interface between the host apparatus 100 and the image reading apparatuses 200a to 200c. In more detail, the first interface 130 may request the image reading apparatus 200a, 200b, or 200c selected through the input unit 120 to transmit the setting information, and receive the setting information from the image reading apparatus 200a, 200b, or 200c.

In this exemplary embodiment, as the host apparatus 100 is connected to the image reading apparatus 200a over a local connection, and is connected to the image reading apparatuses 200b and 200c over a network, the connection interface between the host apparatus 100 and the image reading apparatus 200a is physically different from the connection interface between the host apparatus 100 and the image reading apparatuses 200b and 200c. However, the interfaces for local connection and a network connection are not distinguished in this exemplary embodiment for convenience of description.

The display 140 displays various information that the host apparatus 100 provides to a user. The display 140 may display various UIs, including the list of image reading apparatuses provided by the agent unit 114 and the UI for selecting a scanning option provided by the universal driver 116. The UIs displayed on the display 140 will be explained in more detail with reference to FIGS. 2A to 2D, and 3A to 3C.

The first storage unit 150 stores various information required to operate the host apparatus 100. The first storage unit 150 may include a registry for registering the apparatus information and the setting information of the image reading apparatus 200a, 200b, or 200c selected through the input unit 120, and a database for containing the apparatus information and the setting information of the image reading apparatuses 200a to 200c for each model type. The apparatus information and the setting information registered to the registry may be changed frequently according to the operation of the agent unit 114 as occasion demands, and the apparatus information and the setting information contained in the database may be stored as default values so as to support the setting information in case the setting information cannot be supported by the agent unit 114.

FIGS. 2A to 2D are views of a user interface (UI) for controlling a scanning operation, which is provided from a host apparatus according to an exemplary embodiment.

Figure 2A:
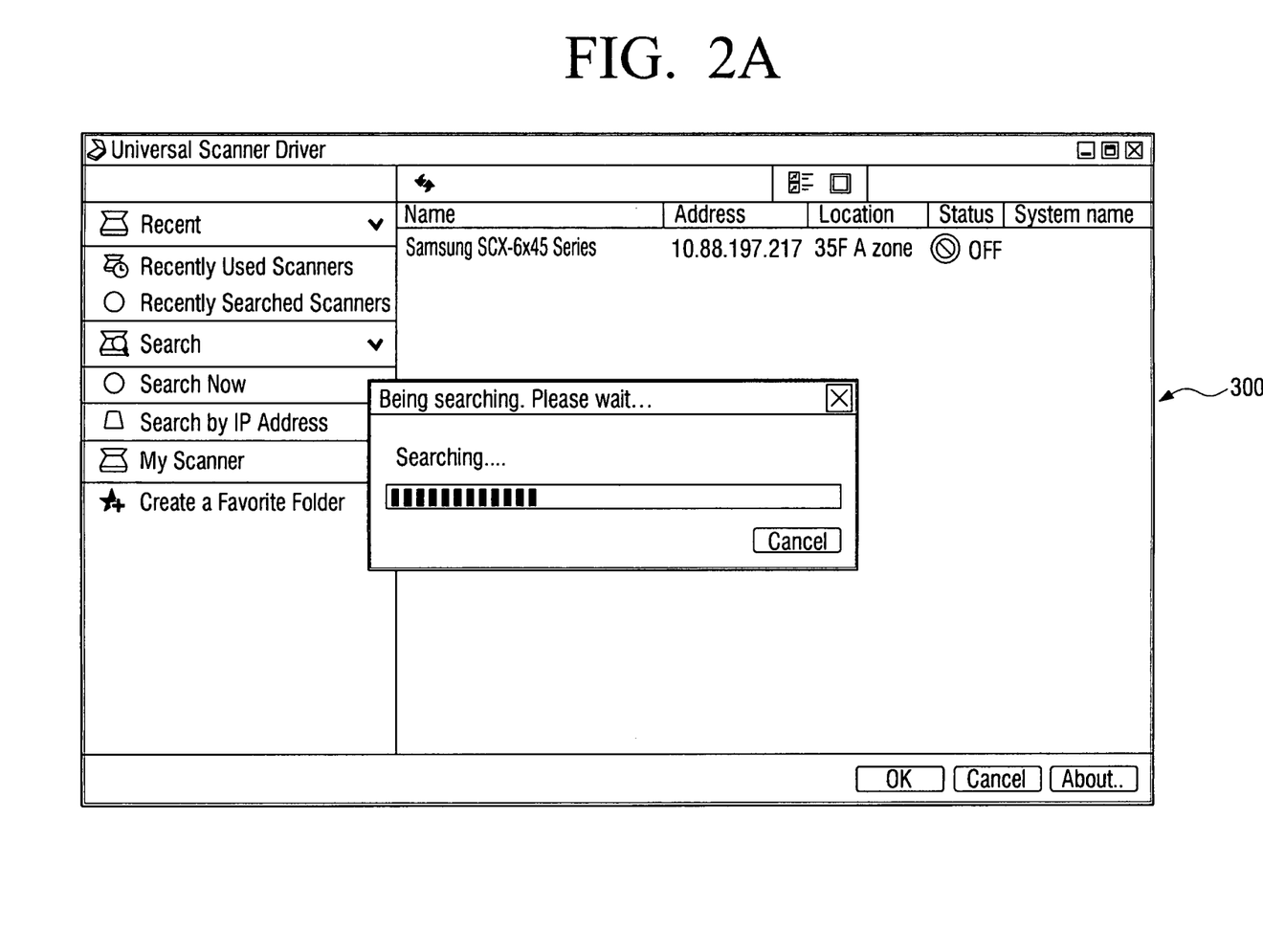
FIGS. 2A to 2D are views of a user interface (UI) for controlling a scanning operation, which is provided from a host apparatus according to an exemplary embodiment.

If a user selects the execution of the universal driver 116 on the application unit 112, the agent unit 114 is driven. The agent unit 114 searches for all of the image reading apparatuses 200a to 200c being connected to the host apparatus 100.

FIG. 2A exemplifies a user interface (UI) 300 to notify that the agent unit 114 is driven and then the image reading apparatuses 200a to 200c are being searched. "Samsung SCX-6x45 Series" displayed on the UI 300 of FIG. 2A represents an apparatus of which a driver is previously installed in the host apparatus 100 before the agent unit 114 searches for the image reading apparatuses 200a to 200c.

Figure 2B:
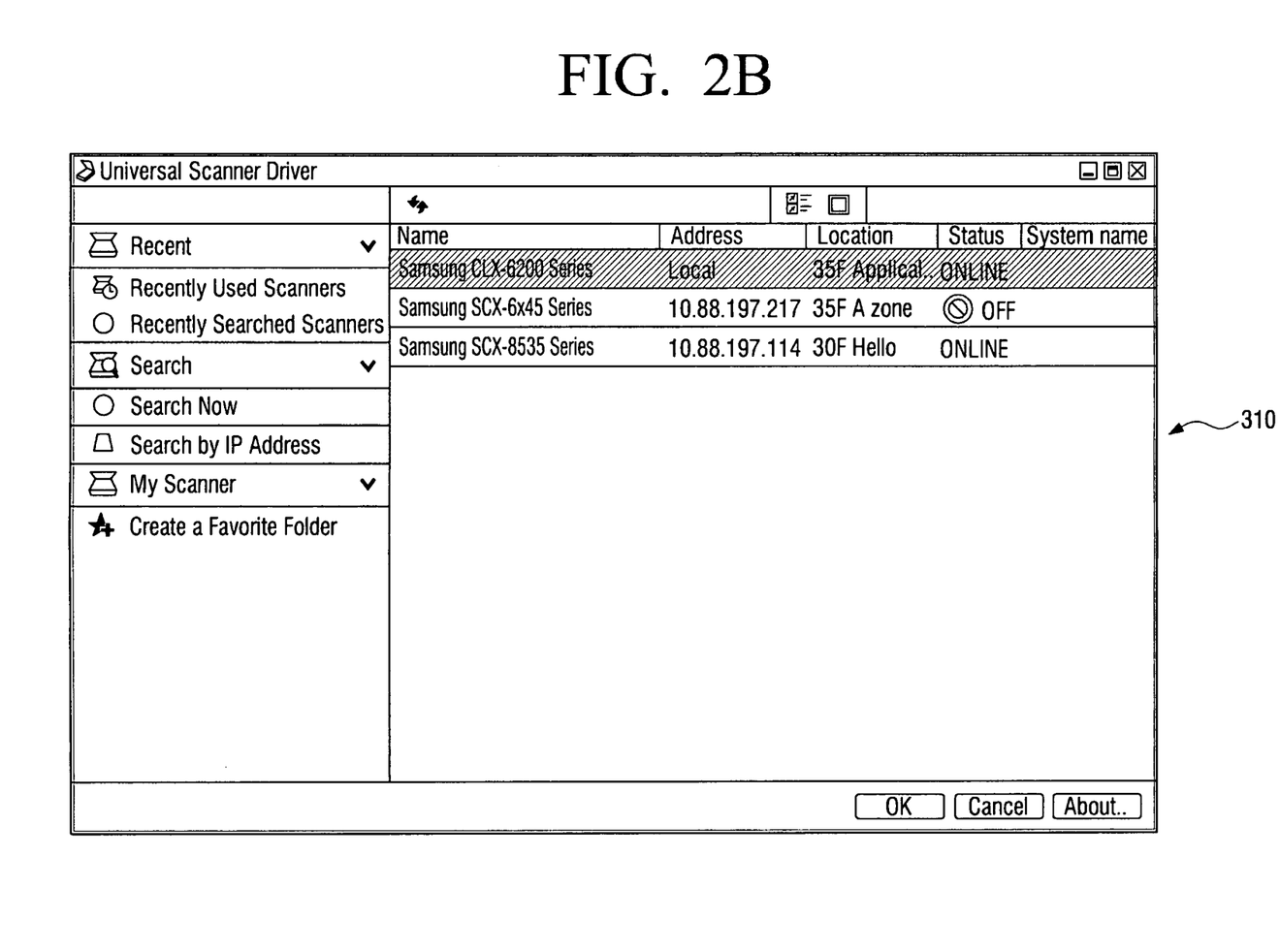

FIG. 2B exemplifies a user interface (UI) 310 to provide a list of the image reading apparatuses 200a to 200c which are searched after the agent unit 114 completes searching for the image reading apparatuses 200a to 200c being connected to the host apparatus 100.

As shown in the UI 310 of FIG. 2B, the apparatus information of the searched image reading apparatuses 200a to 200c may be displayed in a list of the image reading apparatuses 200a to 200c searched by the agent unit 114. The apparatus information may include a name, an address, a location, and a current state of the image reading apparatuses 200a to 200c.

Referring to the UI 310 illustrated in FIG. 2B, the image reading apparatus "Samsung CLX-6200 Series" has in an address "Local." It means that the image reading apparatus "Samsung CLX-6200 Series" is connected to the host apparatus 100 through local connection. The image reading apparatuses "Samsung SCX-6x45 Series" and "Samsung SCX-8535 Series" have the IP addresses. It means that the image reading apparatuses "Samsung SCX-6x45 Series" and "Samsung SCX-8535 Series" are connected to the host apparatus 100 through a network.

A user may easily identify the available image reading apparatus by recognizing the information regarding the location and state of the plurality of image reading apparatuses through the list of image reading apparatuses which is provided in a form of the UI 310 of FIG. 2B.

If a user selects an image reading apparatus from the UI 310 of FIG. 2B, the universal driver 116 receives the setting information by exchanging the information with the selected image reading apparatus, and forms a user interface (UI) 400 for selecting a scanning option.

Figure 2C:
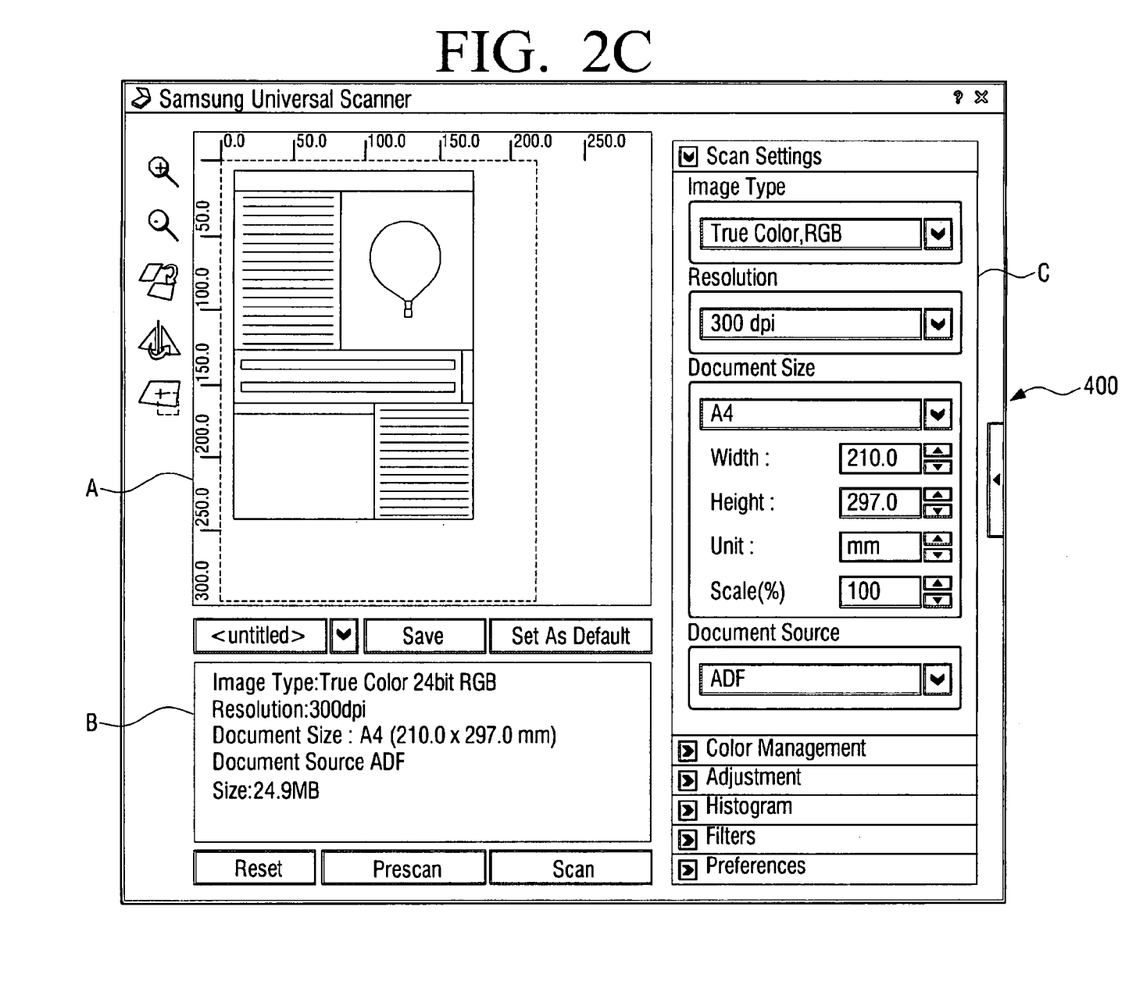

FIG. 2C exemplifies the UI 400 for selecting a scanning option, which is formed by the universal driver 116. The UI 400 for selecting a scanning option may include a region A on which a preview image is displayed, a region B on which setting information is displayed, and a region C on which a menu for selecting an option corresponding to the function supported by the image reading apparatus is displayed.

The setting information provided by a scanner is displayed on the region B so that a user may recognize the setting information, and a menu for selecting an option such as the type of image, resolution, the size of document, a document source, and so on is displayed on the region C.

Figure 2D:
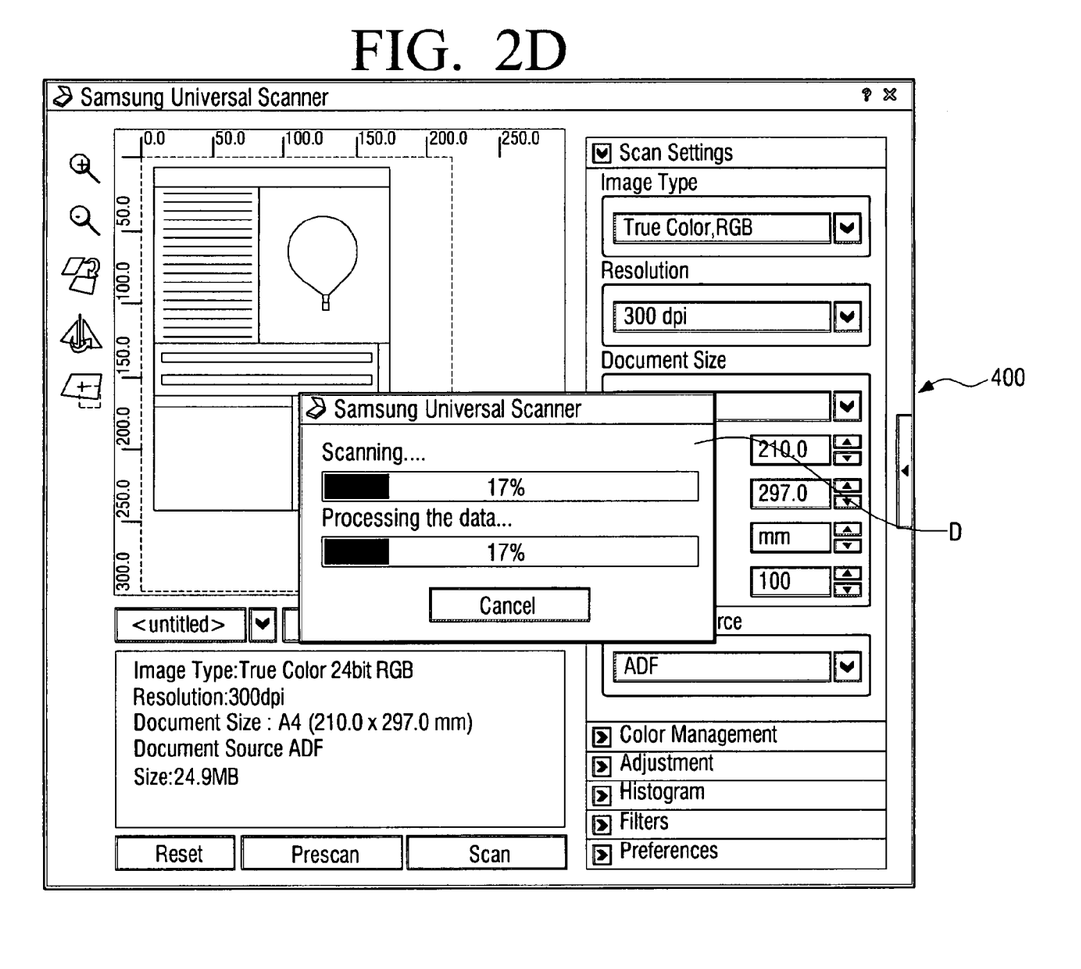

A user inputs the setting information through the UI 400 for selecting a scanning option, and the universal driver 116 transmits a command to perform a scanning operation to respond to the input scanning option to a corresponding scanner. Accordingly, the image reading apparatus which receives the command performs the scanning operation, and a window D which provides the progress of the scanning operation may be displayed on the UI 400 for selecting a scanning option as shown in FIG. 2D.

Figure 3A:
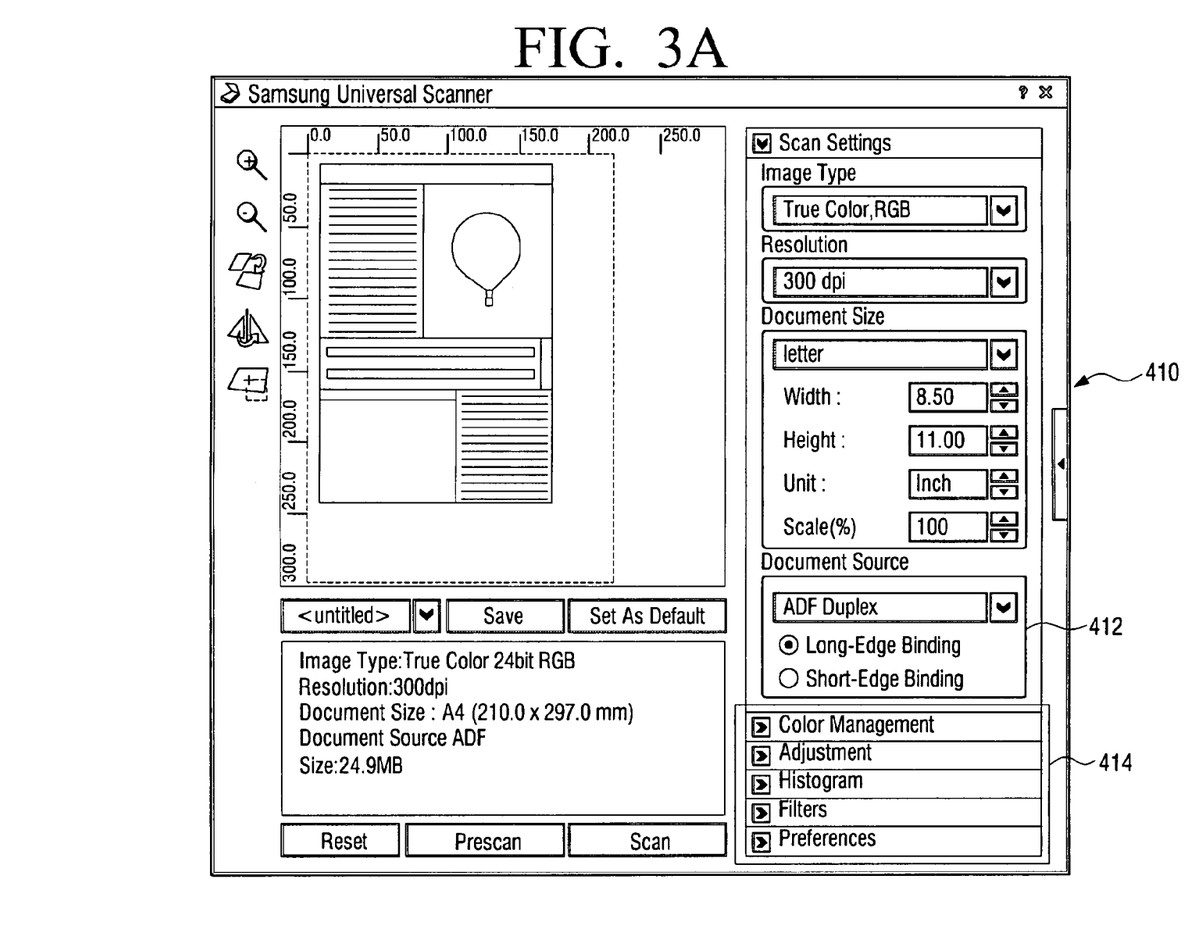
FIGS. 3A to 3C are views of a user interface (UI) for selecting a scanning option which is formed by a universal driver of FIG. 1.
Figure 3B:
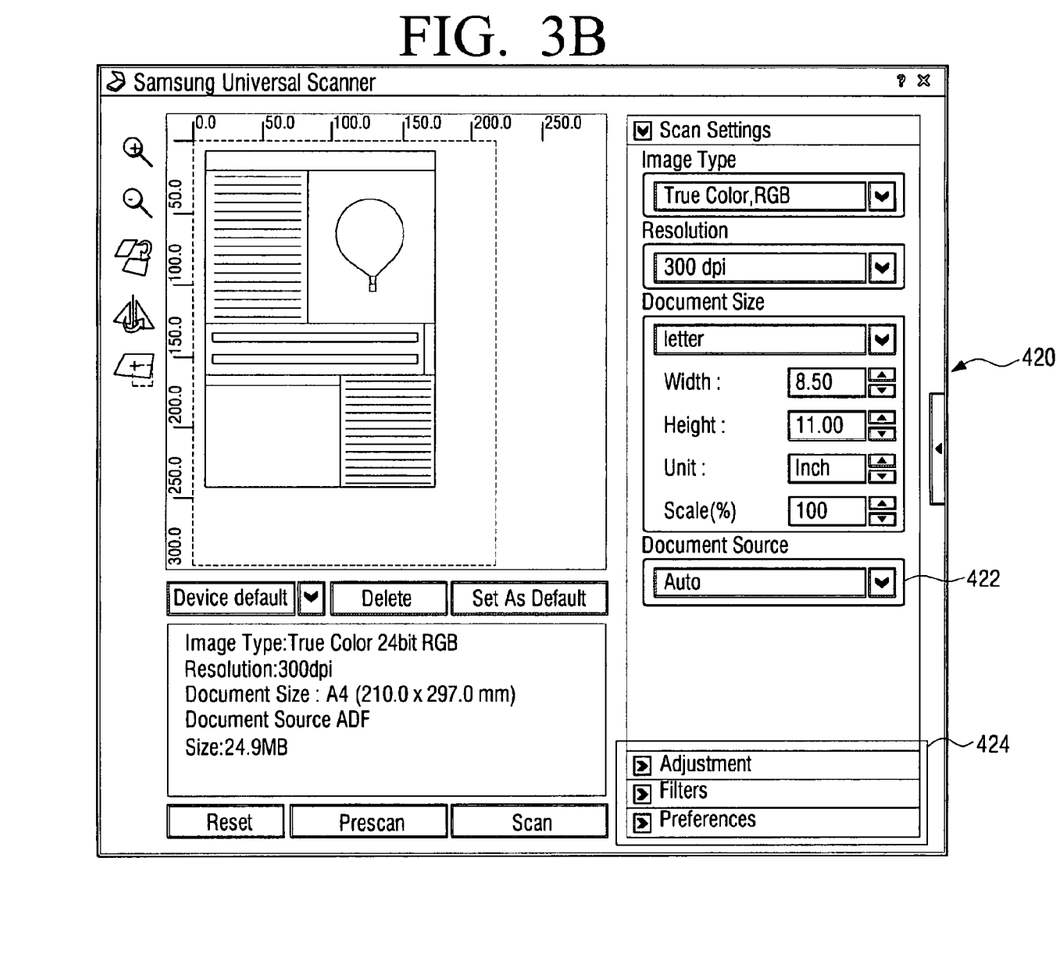
Figure 3C:
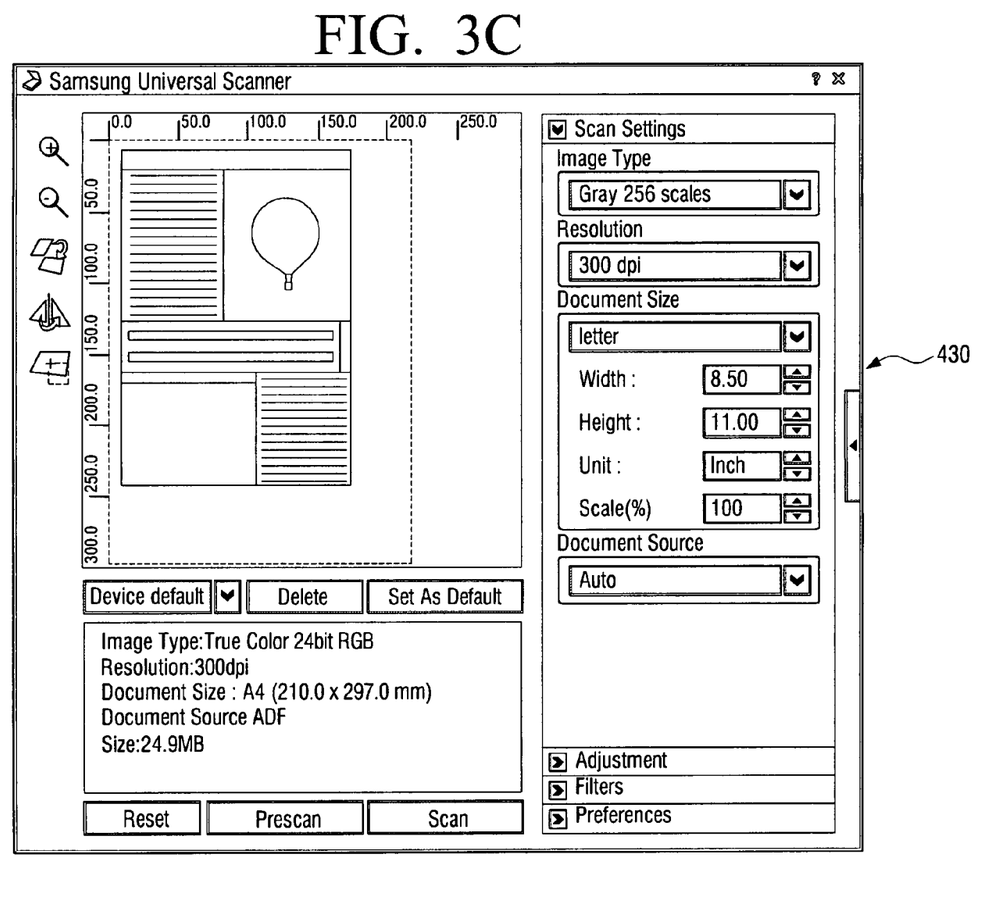

FIGS. 3A to 3C are views of a UI for selecting a scanning option which is formed by the universal driver of FIG. 1.

The universal driver 116 receives setting information of an image reading apparatus by exchanging information with the image reading apparatus registered to the registry by the agent unit 114. By doing so, the universal driver 116 may form the UI 400 for selecting a scanning option, which has a different form according to the input setting information.

FIG. 3A exemplifies a user interface (UI) 410 for selecting the first scanning option for the image reading apparatus which supports color matching, duplex document feeding, and color mode.

The UI 410 for selecting the first scanning option further includes a document source selection menu 412 and a color mode adjusting menu 414 together with a menu for selecting an option such as the type of image, resolution, and the size of document.

"True color, RGB" is displayed in the menu for selecting the type of image among the UI 410 for selecting the first scanning option. This is because the currently selected image reading apparatus supports the color mode. If a user does not want color scanning, the menu for selecting the type of image may be set to "Gray 256 scales" to scan an image to a grayscale.

FIG. 3B exemplifies a user interface (UI) 420 for selecting the second scanning option for the image reading apparatus which supports only color mode without supporting color matching and duplex document feeding.

The UI 420 for selecting the second scanning option further includes a document source selection menu 422 and a color mode adjusting menu 424 together with a menu for selecting an option such as the type of image, resolution, and the size of document. The color mode adjusting menu 424 of the UI 420 for selecting the second scanning option shows parts of the color mode adjusting menu 414 of the UI 410 for selecting the first scanning option.

FIG. 3C exemplifies a user interface (UI) 430 for selecting the third scanning option for the image reading apparatus which does not support any of color matching, duplex document feeding, and color mode.

"Gray 256 scales" is displayed in the menu for selecting the type of image among the UI 430 for selecting the third scanning option. This is because the currently selected image reading apparatus does not support the color mode.

Figure 4:
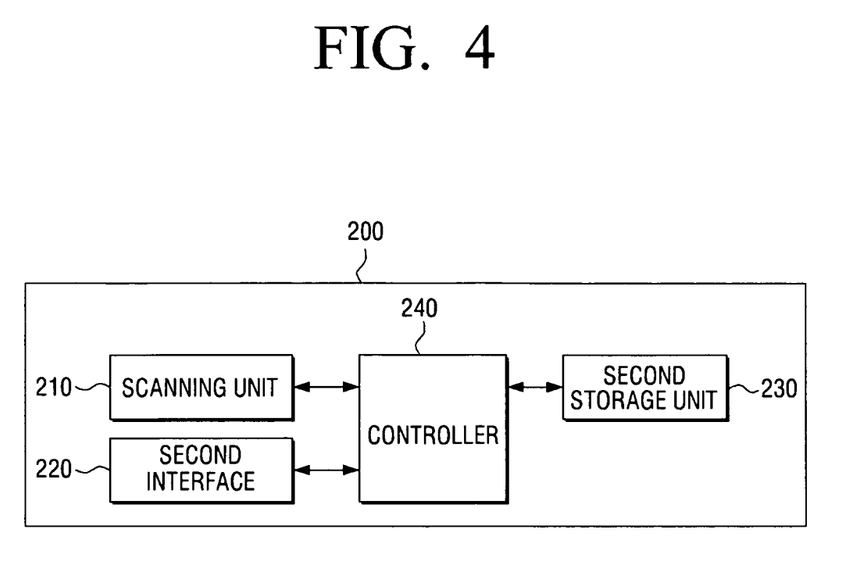
FIG. 4 is a block diagram of an image reading apparatus according to an exemplary embodiment.

FIG. 4 is a block diagram of an image reading apparatus according to an exemplary embodiment of the present invention.

Referring to FIG. 4, an image reading apparatus 200 according to an exemplary embodiment includes a scanning unit 210, a second interface 220, a second storage unit 230, and a controller 240. The elements illustrated in FIG. 4 may be common with those of the image reading apparatuses 200a to 200c illustrated in FIG. 1.

The scanning unit 210 scans a document including photographs, pictures, and text, and reads an image.

The second interface 220 provides interface between the image reading apparatus 200 and the host apparatus 100. In more detail, the second interface 220 may receive a signal for searching for apparatuses and a signal for requesting information from the host apparatus 100, and transmit the apparatus information and the setting information to the host apparatus 100 under the control of the controller 240.

The second storage unit 230 may store various information required to operate the image reading apparatus 200. For example, the second storage unit 230 may store the apparatus information and the setting information of the image reading apparatus 200.

The controller 240 is provided to control overall operations of the image reading apparatus 200, and controls the input and output of signals between the scanning unit 210, the second interface 220, and the second storage unit 230.

If a signal for searching for apparatuses is received from the host apparatus 100 through the second interface 220, the controller 240 controls the second interface 220 to read the apparatus information from the second storage unit 230 and transmit the read apparatus information to the host apparatus 100.

If a signal for requesting information is received from the host apparatus 100 through the second interface 220, the controller 240 controls the second interface 220 to read the setting information from the second storage unit 230 and transmit the read setting information to the host apparatus 100.

If a command to perform a scanning operation is received from the host apparatus 100 through the second interface 220, the controller 240 controls the scanning unit 210 to operate to respond to the command.

Figure 5:
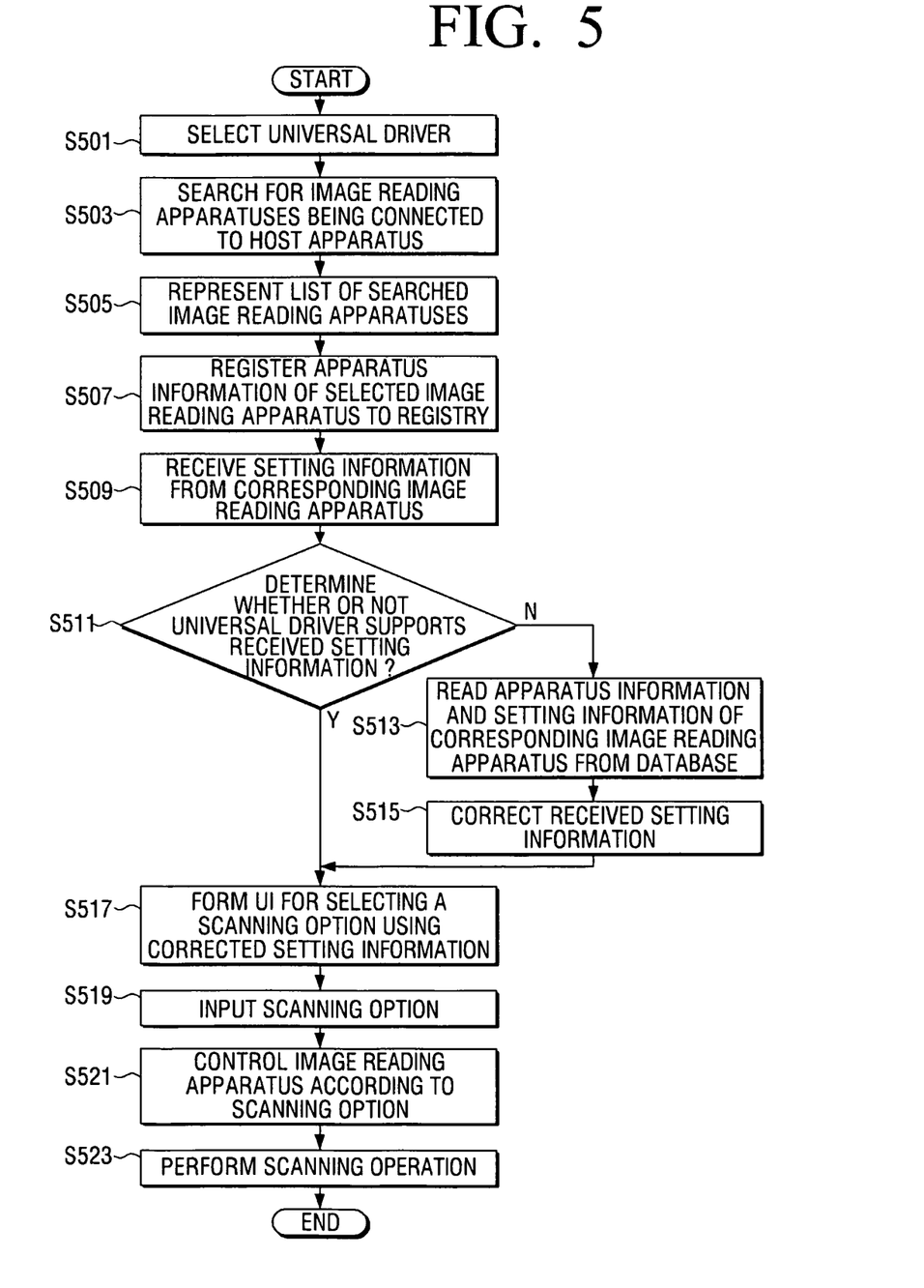
FIG. 5 is a flowchart of the process of controlling a host apparatus according to an exemplary embodiment.

FIG. 5 is a flowchart of the process of controlling a host apparatus according to an exemplary embodiment of the present invention.

A user selects the universal driver 116 through the application unit 112 to use one of the image reading apparatuses 200a to 200c in operation S501. If the universal driver 116 is selected, the agent unit 114 is driven, and searches for all of the image reading apparatuses 200a to 200c which are connected to the host apparatus 100 through local connection and a network in operation S503.

The agent unit 114 searches for all of the image reading apparatuses 200a to 200c being connected to the host apparatus 100, and represents a list of the searched image reading apparatuses 200a to 200c in a form of UI 310 as illustrated in FIG. 2B in operation S505.

A user selects a desired image reading apparatus 200a, 200b, or 200c from the list of the image reading apparatuses 200a to 200c, and the agent unit 114 registers the apparatus information of the selected image reading apparatus 200a, 200b, or 200c to the registry in operation S507.

The universal driver 116 exchanges information with the corresponding image reading apparatus 200a, 200b, or 200c using the apparatus information of the image reading apparatus 200a, 200b, or 200c which is registered to the registry by the agent unit 114. Accordingly, the universal driver 116 receives the setting information from the corresponding image reading apparatus 200a, 200b, or 200c in operation S509.

The universal driver 116 determines whether or not to support the received setting information in operation S511.

In operation S511, if it is determined that the universal driver 116 cannot support the received setting information in operation S511-N, the universal driver 116 reads the apparatus information and the setting information of the corresponding image reading apparatus 200a, 200b, or 200c from a database in operation S513, and corrects the received setting information using the read apparatus information and setting information in operation S515. The universal driver 116 forms the UI 400 for selecting a scanning option using the corrected setting information in operation S517.

In operation S511, if it is determined that the universal driver 116 can support the received setting information in operation S511-Y, the universal driver 116 forms the UI 400 for selecting a scanning option using the setting information received from the image reading apparatus 200a, 200b, or 200c. In this case, the UI 400 for selecting a scanning option may have different forms such as the UIs 410 to 430 for selecting the first to third scanning options according to the function supported by the image reading apparatus 200a, 200b, or 200c in operation S517.

The UI 400 for selecting a scanning option which is formed by the universal driver 116 is displayed on the display 140, and a user inputs the scanning option through the UI 400 for selecting a scanning option in operation S519.

The universal driver 116 transmits a command to control a scanning operation of the scanner to the corresponding image reading apparatus according to the scanning option input by the user in operation S521.

The image reading apparatus receives the command from the universal driver 116 and performs the scanning operation to respond to the received command in operation S523.

Before operation S521, if the protocol supported by the image reading apparatus which is selected by a user is different from the protocol supported by the universal driver 116, the protocol conversion unit 118 may convert the command to control the scanning operation of the image reading apparatus 200a, 200b, or 200c into the protocol which the image reading apparatus 200a, 200b, or 200c supports.

In this case, in operation S521, the universal driver 116 transmits the command which is converted into the protocol supported by the image reading apparatus 200a, 200b, or 200c to the corresponding image reading apparatus 200a, 200b, or 200c. Accordingly, the universal driver 116 of the host apparatus 100 can control an operation of the image reading apparatus 200a, 200b, or 200c irrespective of the type of the image reading apparatus 200a, 200b, or 200c.

Before operation S503, the process of displaying a list of the plurality of image reading apparatuses which are previously registered to the registry may be added. In this case, a user may check whether or not the image reading apparatus is in the list of the image reading apparatuses, and thus the process of searching for the image reading apparatuses being connected to the host apparatus 100 may be omitted from operation S503.

As described above, the universal driver 116 may control various types of image reading apparatuses 200a to 200c without the need of installing driver programs for each of the image reading apparatuses 200a to 200c.

Accordingly, the amount of resources used in the host apparatus 100 is reduced, and the loading time of the driver program is also reduced. When the driver program is updated, only the universal driver 116 has to be updated. Therefore, inconvenience caused by updating driver programs may be resolved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for controlling a host apparatus having a universal driver which controls a plurality of image reading apparatuses, the method comprising:
searching for at least one image reading apparatus being connected to the host apparatus;
displaying a list of image reading apparatuses using first information of the searched at least one image reading apparatus;
selecting one of the at least image reading apparatus from the displayed list of image reading apparatuses;
displaying a user interface (UI) for selecting a scanning option which includes second information of the selected image reading apparatus using the second information corresponding to the selected image reading apparatus;
if the selected image reading apparatus supports a protocol different from that of the universal driver, converting a command to perform a scanning operation into a protocol that the selected image reading apparatus supports; and
controlling the selected image reading apparatus to perform the scanning operation according to the scanning option that is input through the UI for selecting a scanning option.

2. The method according to claim 1, further comprising:
registering the information of the image reading apparatus to a registry,
wherein the information of the image reading apparatus includes at least one of a name, an address, a location, and a current state of the selected image reading apparatus.

3. The method according to claim 2, further comprising further registering the second information of the selected image reading apparatus to the registry.

4. The method according to claim 3, wherein the displaying the UI for selecting a scanning option comprises:
if the first information of the selected image reading apparatus is registered to the registry, displaying the UI for selecting a scanning option using the registered second information; and
if the first information of the selected image reading apparatus is not registered to the registry, receiving the second information from the selected image reading apparatus and displaying the UI for selecting a scanning option.

5. The method according to claim 2, wherein the displaying the UI for selecting a scanning option comprises:
receiving the second information from the image reading apparatus using the first information of the image reading apparatus registered to the registry;
forming the UI for selecting a scanning option using the received second information; and
displaying the formed UI for selecting a scanning option.

6. The method according to claim 1, further comprising requesting the selected image reading apparatus to transmit the second information.

7. The method according to claim 1, further comprising executing the universal driver.

8. The method according to claim 1, further comprising displaying a list of the image reading apparatuses previously registered to the registry before searching for at least one image reading apparatus.

9. The method according to claim 1, wherein the second information includes at least one of a current state of an image reading apparatus, resolution, source information of a document, whether or not the page count is supported, a type of image, the maximum size of paper, optical resolution, a supportable compression method, whether or not an encryption is supported, and whether or not a user authentication is supported.

10. The method according to claim 1, further comprising:
wherein the controlling comprises
transmitting the command which is converted into the protocol supported by the image reading apparatus to the selected image reading apparatus, and
controlling the image reading apparatus to perform the scanning operation.

11. The method according to claim 10, wherein the protocol includes one of a technology without an important name (TWAIN) and a window image acquisition (WIA).

12. The method according to claim 1, further comprising:
determining whether the second information of the selected image reading apparatus is supported by the universal driver or not,
wherein the displaying the UI for selecting a scanning option comprises
if it is determined that the universal driver supports the second information, displaying the UI for selecting a scanning option which is formed using the second information; and if it is determined that the universal driver does not support the second information, displaying the UI for selecting a scanning option which is formed using the previously stored second information of the selected image reading apparatus.

13. A host apparatus, comprising:
an agent unit to search for at least one image reading apparatus;
a display to display a list of image reading apparatuses using first information of the searched at least one image reading apparatus; and
a universal driver, if one of the at least image reading apparatus is selected from the displayed list of image reading apparatuses, to form a user interface (UI) for selecting a scanning option which includes second information of the selected image reading apparatus using the second information corresponding to the selected image reading apparatus; and
if the selected image reading apparatus supports a protocol different from that of the universal driver, a protocol conversion unit to convert the command to perform a scanning operation into a protocol which the selected image reading apparatus supports,
wherein the display displays the UI for selecting a scanning option, and the universal driver controls the selected image reading apparatus to perform a scanning operation according to the scanning option which is input through the UI for selecting a scanning option.

14. The host apparatus according to claim 13, wherein the agent unit registers the first and second information of the selected image reading apparatus to a registry.

15. The host apparatus according to claim 14, wherein if the first information of the selected image reading apparatus is registered to the registry, the universal driver forms the UI for selecting a scanning option using the registered second information, and if the first information of the selected image reading apparatus is not registered to the registry, the universal driver receives the second information from the selected image reading apparatus and forms the UI for selecting a scanning option.

16. The host apparatus according to claim 13, wherein the universal driver receives the second information from the image reading apparatus using the first information of the selected image reading apparatus, and forms the UI for selecting a scanning option using the received second information.

17. The host apparatus according to claim 13, further comprising
a first interface to transmit the command which is converted into the protocol supported by the image reading apparatus to the image reading apparatus.

18. An image reading apparatus, comprising:
a storage unit to store first and second information;
an interface capable of receiving a signal for searching for a plurality of image reading apparatuses and a signal for requesting information sent from a host apparatus having a universal driver that controls the plurality of image reading apparatuses; and
a controller, if the signal for searching for the image reading apparatuses is received through the interface, to transmit the stored first information to the host apparatus, and if the signal for requesting information is received, to transmit the stored second information to the host apparatus,
wherein if the image reading apparatus supports a protocol different from that of the universal driver, the second information supports conversion by the host apparatus of a command to perform a scanning operation into a protocol which the image reading apparatus supports.

* * * * *